(12) United States Patent
Shan

(10) Patent No.: US 10,805,022 B2
(45) Date of Patent: Oct. 13, 2020

(54) METHOD OF USING TIME DOMAIN SUBSPACE SIGNALS AND SPATIAL DOMAIN SUBSPACE SIGNALS FOR LOCATION APPROXIMATION THROUGH ORTHOGONAL FREQUENCY-DIVISION MULTIPLEXING

(71) Applicant: Tiejun Shan, Plano, TX (US)

(72) Inventor: Tiejun Shan, Plano, TX (US)

(73) Assignee: THE EUCLIDE 2012 INVESTMENT TRUST, Plano, TX (US)

( * ) Notice: Subject to any disclaimer, the term of this patent is extended or adjusted under 35 U.S.C. 154(b) by 74 days.

(21) Appl. No.: 16/276,288

(22) Filed: Feb. 14, 2019

(65) Prior Publication Data

US 2019/0222330 A1   Jul. 18, 2019

Related U.S. Application Data

(63) Continuation-in-part of application No. 16/248,761, filed on Jan. 15, 2019, and a continuation-in-part of application No. 16/242,958, filed on Jan. 8, 2019, and a continuation-in-part of application No. 16/249,351, filed on Jan. 16, 2019, application No. 16/276,288, (Continued)

(51) Int. Cl.
*H04B 17/364* (2015.01)
*H04B 7/0413* (2017.01)
*H04B 1/707* (2011.01)
*H04L 5/00* (2006.01)
(Continued)

(52) U.S. Cl.
CPC ............. *H04B 17/364* (2015.01); *G01S 3/14* (2013.01); *H04B 1/707* (2013.01); *H04B 7/0413* (2013.01); *H04L 5/005* (2013.01);
*H04L 5/0007* (2013.01); *H04L 5/0023* (2013.01); *H04L 5/0048* (2013.01); *H04W 64/006* (2013.01)

(58) Field of Classification Search
CPC ...... H04B 17/364; H04W 64/006; G01S 3/14; H04L 5/0023; H04L 5/005
USPC .......................... 342/107, 142, 104, 175, 27
See application file for complete search history.

(56) References Cited

U.S. PATENT DOCUMENTS

2006/0262874 A1* 11/2006 Shan ...................... H04W 52/50
375/267
2006/0274641 A1* 12/2006 Grieco ................ H04L 27/2614
370/210

(Continued)

*Primary Examiner* — Bo Fan

(57) ABSTRACT

A method for location approximation through time-domain subspace signals and spatial domain subspace signals is provided with an orthogonal frequency-division multiplexing (OFDM)-based wireless device that includes a wireless terminal, a multiple-input and multiple-output (MIMO) antenna, a spatial subspace processor, and a temporal subspace processor. An uplink signal is transmitted from the wireless terminal towards a plurality of targets positioned within an operational range of the MIMO antenna. A plurality of reflected signals generated from the plurality of targets is received through the MIMO antenna. The plurality of reflected signals is processed at the spatial subspace processor to determine a direction of arrival (DOA) for each of plurality of reflected signals. Each of the plurality of reflected signals is processed by the temporal subspace processor to determine a time delay. The time delay and the DOA are utilized to derive a location approximation for the plurality of targets.

15 Claims, 20 Drawing Sheets

Related U.S. Application Data filed on Feb. 14, 2019, which is a continuation-in-part of application No. 16/252,257, filed on Jan. 18, 2019, application No. 16/276,288, which is a continuation-in-part of application No. 16/252,377, filed on Jan. 18, 2019, application No. 16/276,288, which is a continuation-in-part of application No. 16/271,567, filed on Feb. 8, 2019.

(60) Provisional application No. 62/617,962, filed on Jan. 16, 2018, provisional application No. 62/616,844, filed on Jan. 12, 2018, provisional application No. 62/630,416, filed on Feb. 14, 2018, provisional application No. 62/754,448, filed on Nov. 1, 2018, provisional application No. 62/756,318, filed on Nov. 6, 2018, provisional application No. 62/617,723, filed on Jan. 16, 2018, provisional application No. 62/618,735, filed on Jan. 18, 2018, provisional application No. 62/619,204, filed on Jan. 19, 2018, provisional application No. 62/628,436, filed on Feb. 9, 2018.

(51) Int. Cl.
*H04W 64/00* (2009.01)
*G01S 3/14* (2006.01)

(56) References Cited

U.S. PATENT DOCUMENTS

| | | | | |
|---|---|---|---|---|
| 2009/0222262 | A1* | 9/2009 | Kim | G10L 21/0272 704/231 |
| 2010/0245052 | A1* | 9/2010 | Kitayoshi | G06K 19/07749 340/10.4 |
| 2013/0300596 | A1* | 11/2013 | Shirakawa | G01S 3/74 342/146 |
| 2018/0267157 | A1* | 9/2018 | Guruprasad | G01S 11/14 |

* cited by examiner

METHOD OF USING TIME DOMAIN SUBSPACE SIGNALS AND SPATIAL DOMAIN SUBSPACE SIGNALS FOR LOCATION APPROXIMATION THROUGH ORTHOGONAL FREQUENCY-DIVISION MULTIPLEXING

The current application claims a priority to the U.S. Provisional Patent application Ser. No. 62/630,416 filed on Feb. 14, 2018.

The current application also claims a priority to a U.S. non-provisional application Ser. No. 16/271,567 filed on Feb. 8, 2019. The U.S. non-provisional application Ser. No. 16/271,567 claims a priority to the U.S. Provisional Patent application Ser. No. 62/628,436 filed on Feb. 9, 2018.

The current application also claims a priority to a U.S. non-provisional application Ser. No. 16/252,377 filed on Jan. 18, 2019. The U.S. non-provisional application Ser. No. 16/252,377 claims a priority to the U.S. Provisional Patent application Ser. No. 62/619,204 filed on Jan. 19, 2018.

The current application also claims a priority to a U.S. non-provisional application Ser. No. 16/252,257 filed on Jan. 18, 2019. The U.S. non-provisional application Ser. No. 16/252,257 claims a priority to the U.S. Provisional Patent application Ser. No. 62/618,735 filed on Jan. 18, 2018.

The current application also claims a priority to a U.S. non-provisional application Ser. No. 16/249,351 filed on Jan. 16, 2019. The U.S. non-provisional application Ser. No. 16/249,351 claims a priority to a U.S. provisional application Ser. No. 62/617,723 filed on Jan. 16, 2018.

The current application also claims a priority to a U.S. non-provisional application Ser. No. 16/248,761 filed on Jan. 15, 2019. The U.S. non-provisional application Ser. No. 16/248,761 claims a priority to a U.S. provisional application Ser. No. 62/617,962 filed on Jan. 16, 2018.

The current application also claims a priority to a U.S. non-provisional application Ser. No. 16/242,958 filed on Jan. 8, 2019. The U.S. non-provisional application Ser. No. 16/242,958 claims a priority to a U.S. provisional application Ser. No. 62/616,844 filed on Jan. 12, 2018.

The current application also claims a priority to the U.S. Provisional Patent application Ser. No. 62/754,448 filed on Nov. 1, 2018.

The current application also claims a priority to the U.S. Provisional Patent application Ser. No. 62/756,318 filed on Nov. 6, 2018.

FIELD OF THE INVENTION

The present invention relates generally to a target location approximation system based upon time domain subspace signals and spatial domain subspace signals. By utilizing high-resolution subspace signals the overall accuracy of location approximation is improved.

BACKGROUND OF THE INVENTION

Wireless communication networks and radar functionalities have been a main focus among automobile manufacturers and research groups. The immense benefits related to wireless technologies is the main reason for the extra attention. Automatic driving and artificial intelligence (AI) are some of the services that have been made possible through advancements in the wireless technology industry.

Vehicle to everything, also known as $V_2X$, is a communication method where a selected vehicle utilizes a variety of sensors and transmission signals to fulfill autonomous driving requirements. Since many vehicles utilize similar wireless technologies, interference and jamming can occur and can affect the overall accuracy of an obtained result. The present invention intends to address the issue by utilizing a set of time domain subspace signals and a set of spatial domain subspace signals. More specifically, the present invention utilizes a multiple-input and multiple-output (MIMO) antenna to create a subspace-based radar communication system. By deriving a time delay and determining a direction of arrival of a plurality of reflected signals, the present invention can proceed to determine a location approximation for a selected number of targets located within an operational range of the MIMO antenna. Since interference and jamming is eliminated, an accurate result can be derived through the present invention.

DETAIL DESCRIPTIONS OF THE INVENTION

Figure 1:
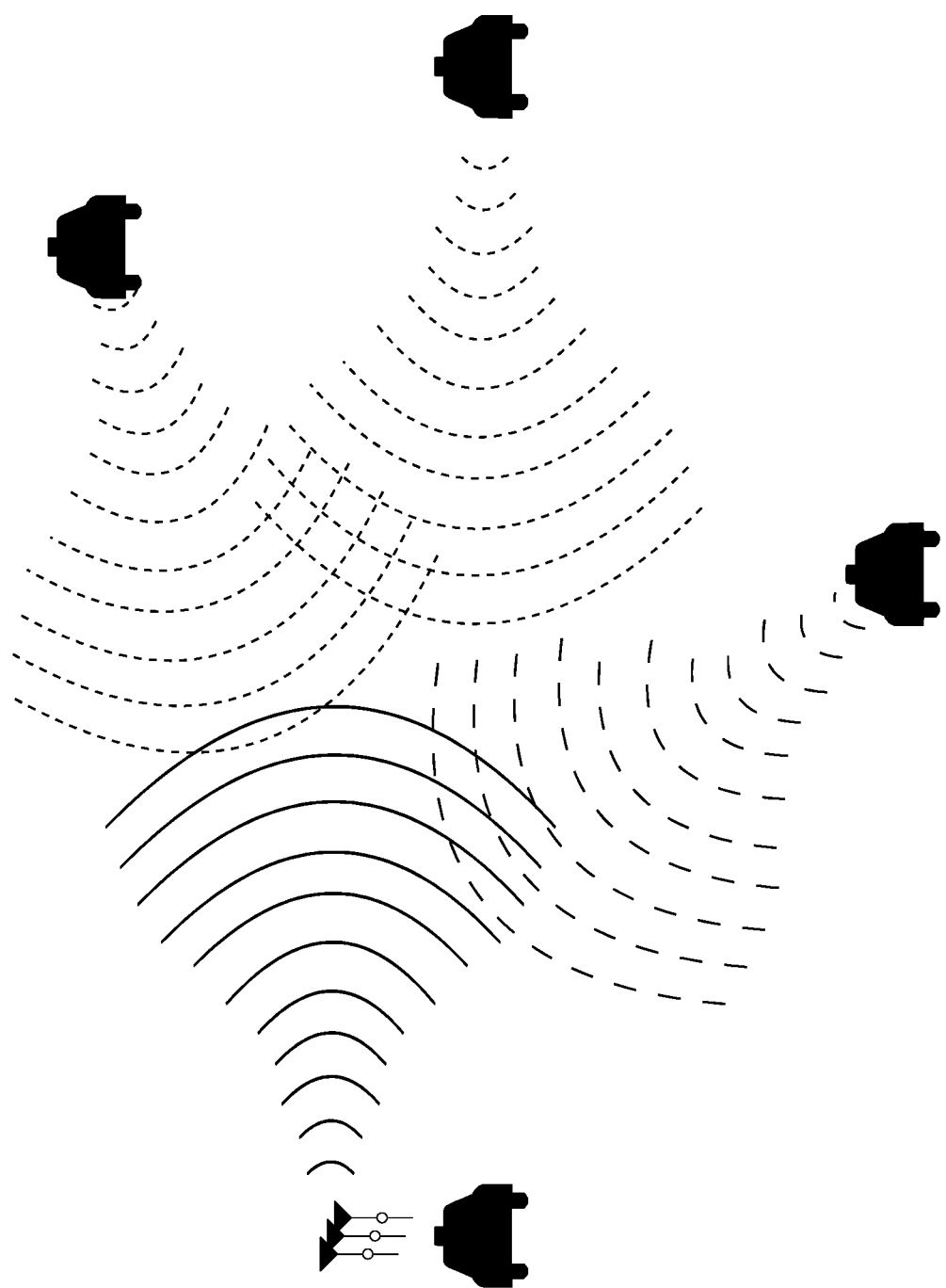
FIG. 1 is an illustration of utilizing the present invention with a plurality of targets.
Figure 2:
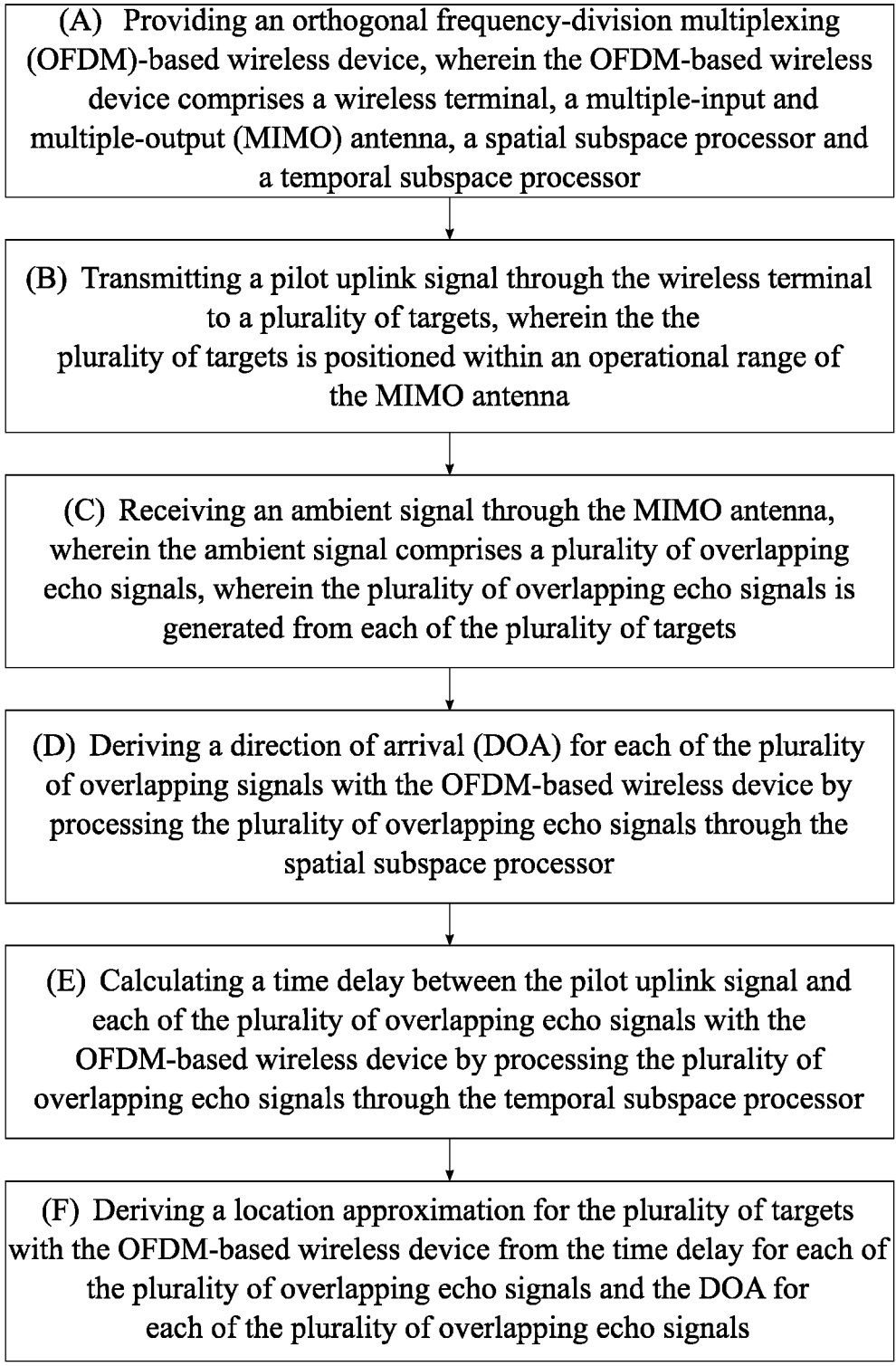
FIG. 2 is a flowchart illustrating the basic overall process of the present invention.
Figure 3:
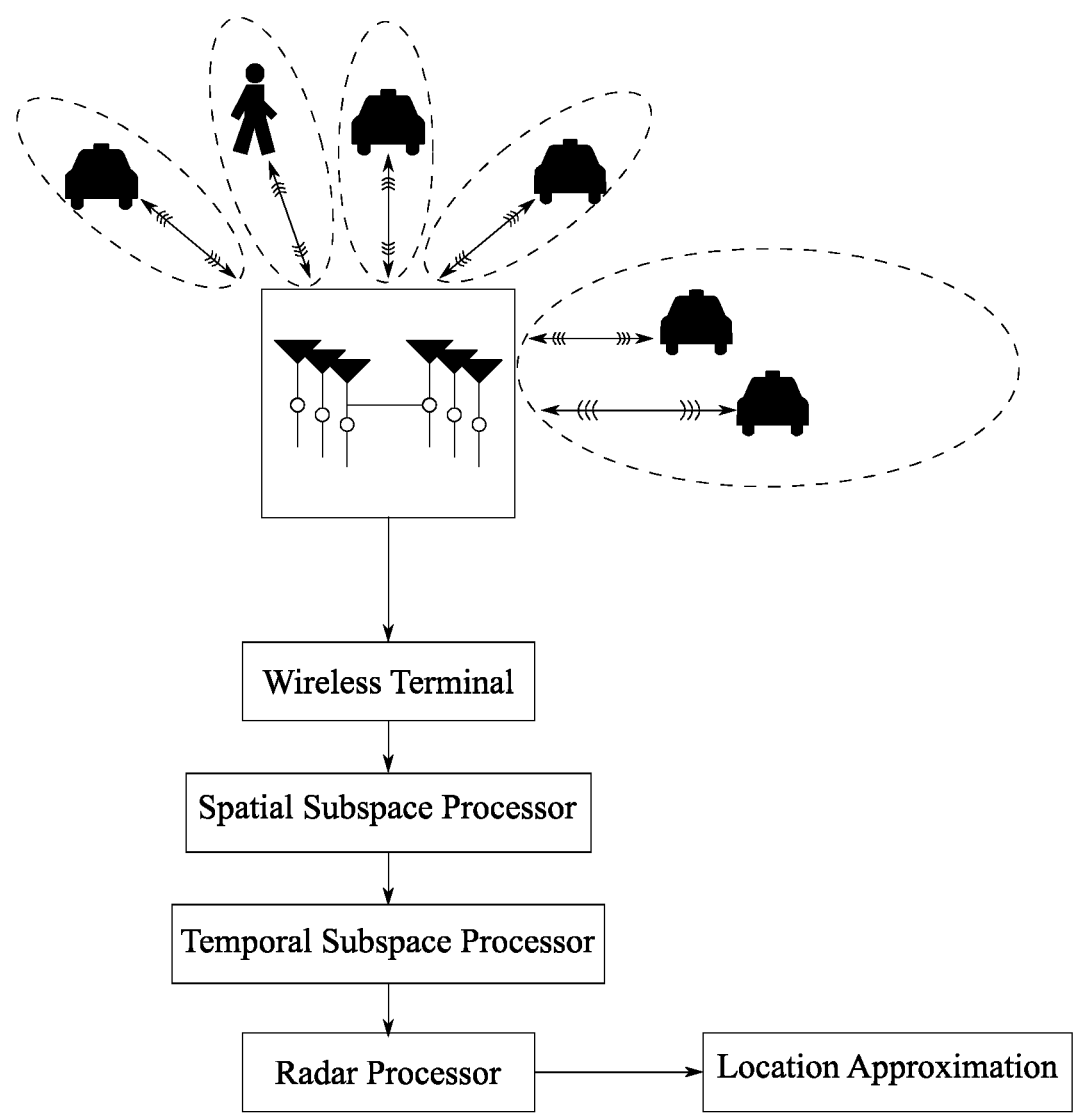
FIG. 3 is an illustration of the location approximation process.
Figure 4:
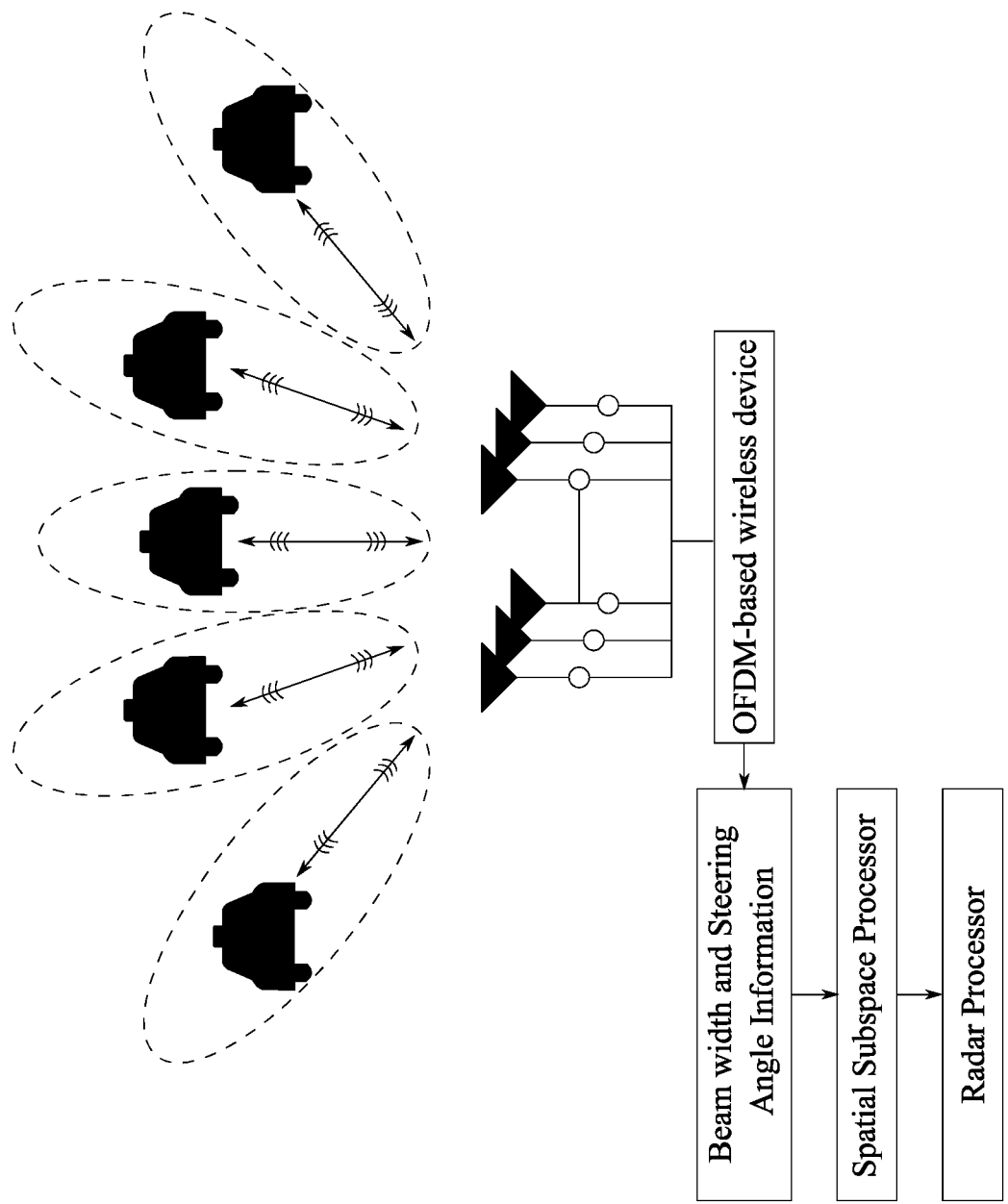
FIG. 4 is an illustration of using the spatial subspace processor to determine the direction of arrival of each of the plurality of overlapping echo signals.

All illustrations of the drawings are for the purpose of describing selected versions of the present invention and are not intended to limit the scope of the present invention.

The present invention introduces a method that can be used for target location approximation. To do so, the present invention utilizes communication standards that can be, but is not limited to, fourth generation (4G) wireless, fifth generation (5G) wireless, 4G-long term evolution (4G-LTE), and Wi-Fi. The present invention utilizes high-resolution subspace signals within the previously listed communication standards for time delay calculations and for determining the direction of arrival (DOA) of a signal. A subspace estimation algorithm is used along with time delay calculations and the DOA of a signal to derive a target location approximation, wherein the subspace estimation algorithm optimizes the overall target detection accuracy.

As seen in FIGS. 1-4 and FIG. 20, to fulfill the intended functionalities, the present invention is provided with an orthogonal frequency-division multiplexing (OFDM)-based wireless device that comprises a wireless terminal, a multiple-input and multiple-output antenna, a spatial subspace processor, and a temporal subspace processor (Step A). The wireless terminal functions as an access point for an incoming signal or an outgoing signal. On the other hand, the MIMO antenna is used to determine an operational range that the present invention can be used in. In other words, the present invention can be used with a set of targets that is located within an operational range of the MIMO antenna.

To initiate the location approximation process, the present invention utilizes the wireless terminal to transmit a pilot uplink signal, which comprises a plurality of subcarriers, towards a plurality of targets that are positioned within an operational range of the MIMO antenna (Step B). The operational range of the MIMO antenna can vary from one embodiment to another. After the pilot uplink signal is transmitted omnidirectionally towards the plurality of targets, the present invention proceeds to receive an ambient signal through the MIMO antenna, wherein the ambient signal comprises a plurality of overlapping echo signals (Step C). The plurality of overlapping echo signals is used in the target location approximation process since the plurality of overlapping echo signals is generated after the plurality of targets receive the pilot uplink signal.

When the plurality of overlapping echo signals is received at the OFDM-based wireless device, the present invention utilizes the spatial subspace processor of the OFDM-based wireless device to derive a direction of arrival (DOA) for each of the plurality of overlapping echo signals (Step D). To do so, the plurality of overlapping echo signals is processed by the spatial subspace processor. The temporal subspace processor is used to calculate a time delay between the pilot uplink signal and each of the plurality of overlapping echo signals. To do so, the plurality of overlapping echo signals is processed by the temporal subspace processor (Step E). At the temporal subspace processor, the time delay is calculated by comparing the pilot uplink signal with each of the plurality of overlapping echo signals. When the DOA for each of the plurality of overlapping echo signals and the time delay between the pilot uplink signal and the plurality of overlapping echo signals are determined, the present invention proceeds to derive a location approximation for the plurality of targets through the OFDM-based wireless device (Step F).

Figure 5:
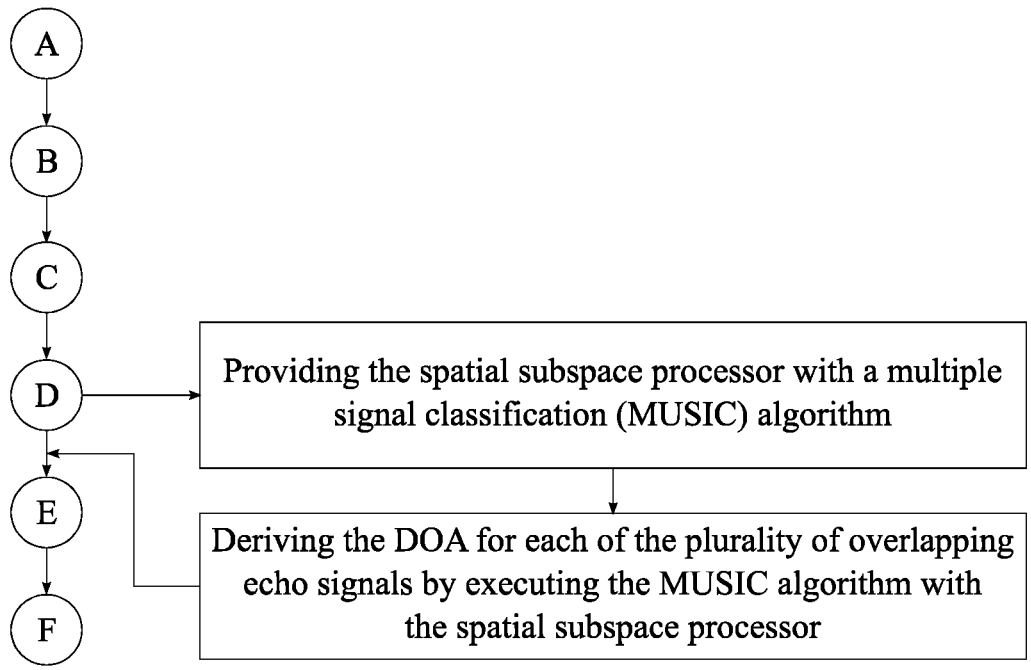
FIG. 5 is flowchart illustrating the basic overall process of using the multiple signal classification (MUSIC) algorithm to determine the DOA of each of the plurality of overlapping echo signals.
Figure 6:
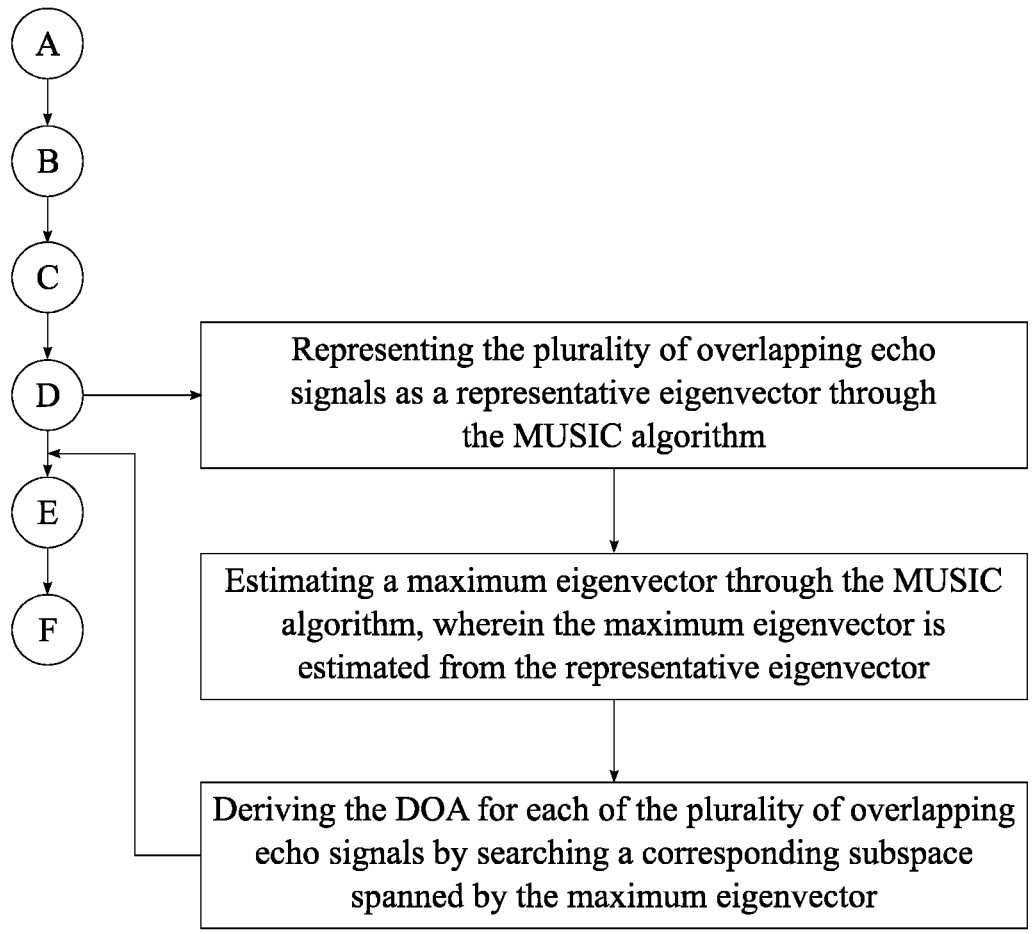
FIG. 6 is a flowchart illustrating the basic overall process of executing the MUSIC algorithm to determine the DOA of each of the plurality of overlapping echo signals.

As shown in FIG. 5 and FIG. 6, to derive the DOA of each of the plurality of overlapping echo signals, the spatial subspace processor is provided with a multiple signal classification (MUSIC) algorithm which is generally used for frequency estimation and radio direction finding. In the process of deriving the DOA, the MUSIC algorithm is executed through the spatial subspace processor so that each of the plurality of overlapping echo signals is initially represented as a representative eigenvector through the MUSIC algorithm. When the MIMO antenna is an antenna array consisting of M points, and stacks the plurality of overlapping echo signals in a vector of length M, the MUSIC algorithm is used to derive the following equation:

$$r_j = \begin{bmatrix} r_j(t_1) \\ r_j(t_2) \\ \vdots \\ r_j(t_M) \end{bmatrix} = \begin{bmatrix} \vdots & \vdots & \vdots & & \vdots \\ A(\theta_1) & A(\theta_2) & A(\theta_3) & \cdots & A(\theta_D) \\ \vdots & \vdots & \vdots & & \vdots \end{bmatrix} \begin{bmatrix} m_{1j} \\ m_{2j} \\ \vdots \\ m_{Dj} \end{bmatrix} + \begin{bmatrix} n_j(t_1) \\ n_j(t_2) \\ \vdots \\ n_j(t_M) \end{bmatrix}$$

Next, the representative eigenvector is used to estimate a maximum eigenvector, wherein the maximum eigenvector is also derived through the MUSIC algorithm. The maximum eigenvector is defined by:

$$A^T(\Theta) = [s(t_1-\Theta), s(t_2-\Theta) \ldots s(t_M-\Theta)]^T$$

when a signal selected from the plurality of overlapping echo signals is represented in a vector format as:

$$r(t) = A[\Theta_{i|i=1,2,\ldots,k}]s(t) + n(t)$$

When the maximum eigenvector is estimated, the present invention proceeds to derive the DOA for each of the plurality of overlapping echo signals by searching a corresponding subspace spanned by the maximum eigenvector. The covariance matrix of a selected signal from the plurality of echo signals can be shown as:

$$R = A[\Theta_{i|i=1,2,\ldots,k}] S A[\Theta_{i|i=1,2,\ldots,k}]^* N$$

and the vector used for the DOA of each of the plurality of overlapping echo signals can be shown as:

$$\Phi(\theta) = \frac{1}{\sum_{j=1}^{M-D} \|A(\theta) * E_j\|^{\wedge 2}}$$

wherein $\Theta$ represents the operational range of the MIMO antenna and $E_j$ represents the $j^{th}$ eigenvector of the covariance matrix.

If the plurality of overlapping echo signals consisted of a K-number of signals, the covariance matrix can be represented as:

$$(1/K)\Sigma_{i=1}^{k} r(t_i) r^*(t_i)$$

If a spectral decomposition was performed on the covariance matrix, the following equation can be derived:

$$\hat{R} = \sum_{i=1}^{M} \lambda_i V_i V_i *$$

Wherein, $\lambda_1 \leq \lambda_2 \leq \ldots \leq \lambda_M$.

As a final step of the calculations, the DOA estimate can be determined by plotting the data points according to the following equation which is used to estimate the maximum eigenvector from the representative eigenvector.

$$\Phi(\theta) = \frac{A*(\theta)A(\theta)}{\sum_{j=1}^{M-D} \|A(\theta)*\vec{s}_j\|^{\wedge}2}$$

As discussed earlier, after the DOA for each of the plurality of overlapping echo signals is determined, the output of the spatial subspace processor is transferred to the temporal subspace processor as an input. Similar to the spatial subspace processor using the MUSIC algorithm to determine the DOA, the temporal subspace processor utilizes the MUSIC algorithm to calculate the time delay.

Figure 7:
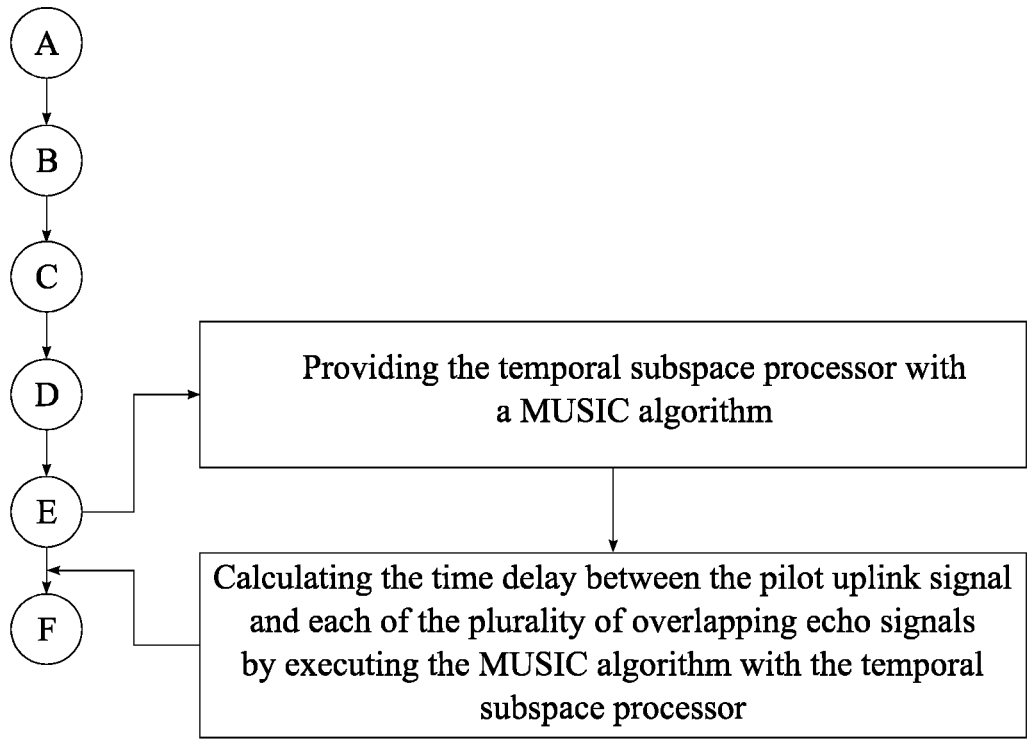
FIG. 7 is a flowchart illustrating the basic overall process of using the MUSIC algorithm to calculate the time delay between the pilot uplink signal and each of the plurality of overlapping echo signals.
Figure 8:
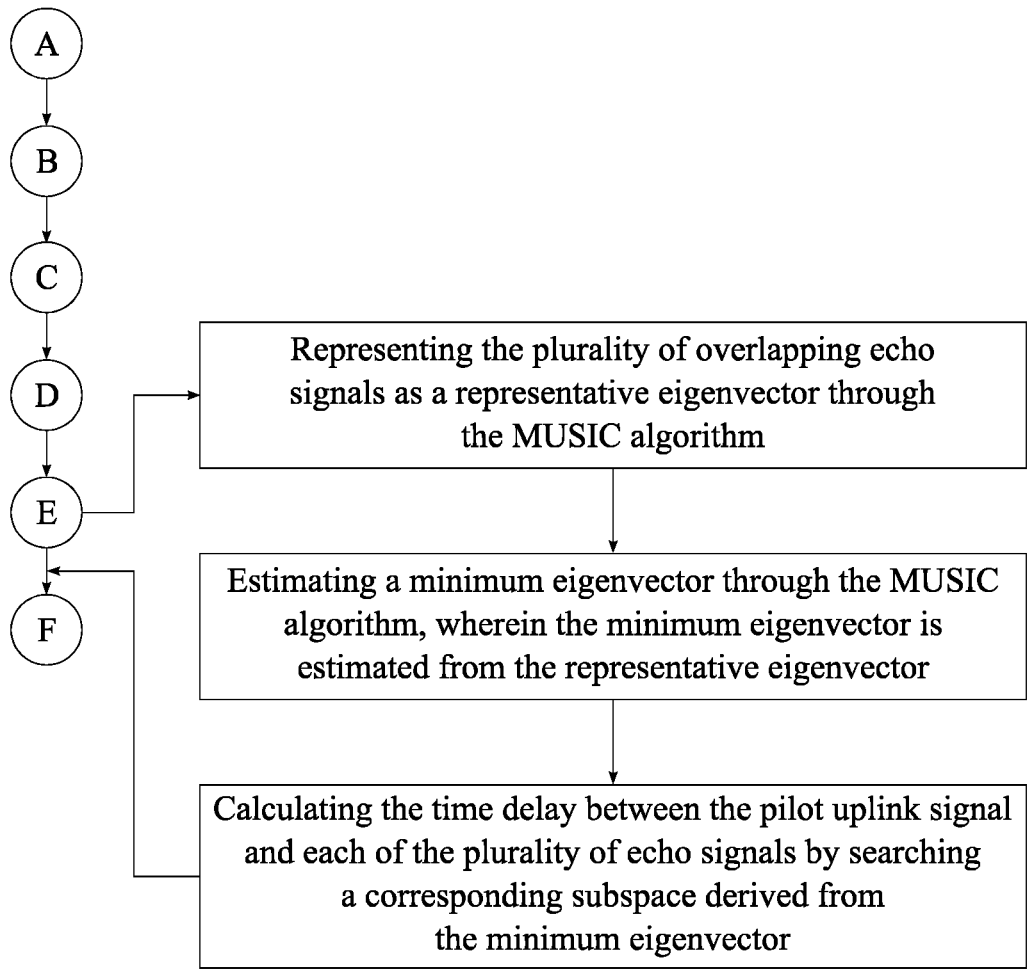
FIG. 8 is a flowchart illustrating the basic overall process of executing the MUSIC algorithm to calculate the time delay between the pilot uplink signal and each of the plurality of overlapping echo signals.

As shown in FIG. 7 and FIG. 8, in the process of calculating the time delay, the plurality of overlapping echo signals is initially represented as a representative eigenvector by executing the MUSIC algorithm through the temporal subspace processor. Next, the MUSIC algorithm is applied to estimate a minimum eigenvector from the representative eigenvector so that the time delay between the pilot uplink signal and each of the plurality of overlapping echo signals can be calculated by searching a corresponding subspace derived from the minimum eigenvector. The minimum eigenvector will be orthogonal to a signature vector of each of the plurality of overlapping echo signals. A selected signal from the plurality of overlapping echo signals can be represented through the following equation.

$$r(t) = \sum_{i=1}^{D} m_i s(t-\theta_i) + n(t)$$

In this instance, $\Theta$ represents the time delay for the $i^{th}$ target that resulted in the selected signal represented above. When the time delay calculations are performed over a time period defined from 0 to T, the following equation expresses the time delay between the pilot uplink signal and each of the plurality of overlapping echo signals.

$$\Phi(\theta) = \frac{A(\theta)A*(\theta)}{\sum_{j=1}^{M-D} \|A(\theta)*\vec{s}_t\|^{\wedge}2}$$

Figure 18:
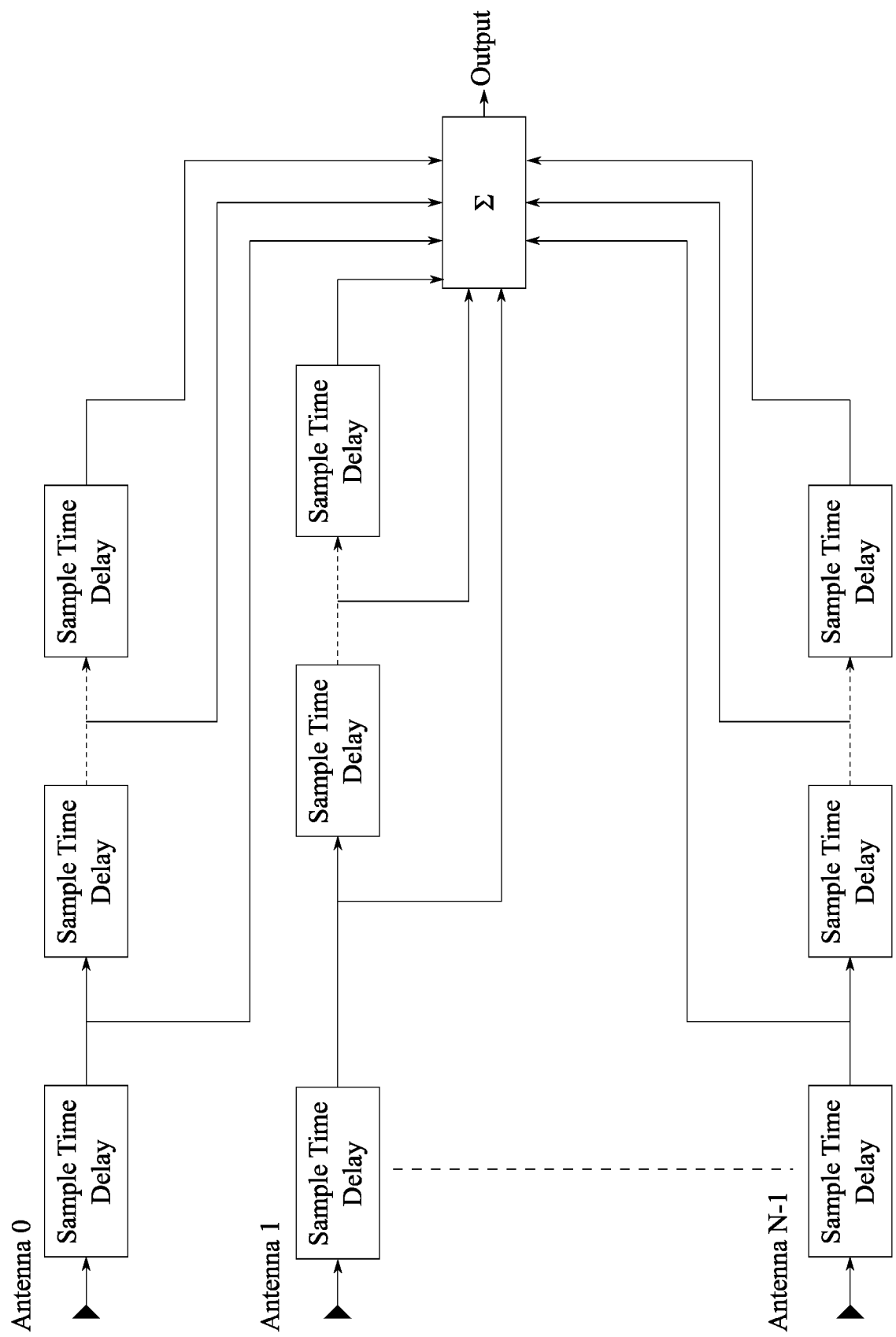
FIG. 18 is an illustration of transmitting a summation output from the spatial subspace processor to the temporal subspace processor.
Figure 19:
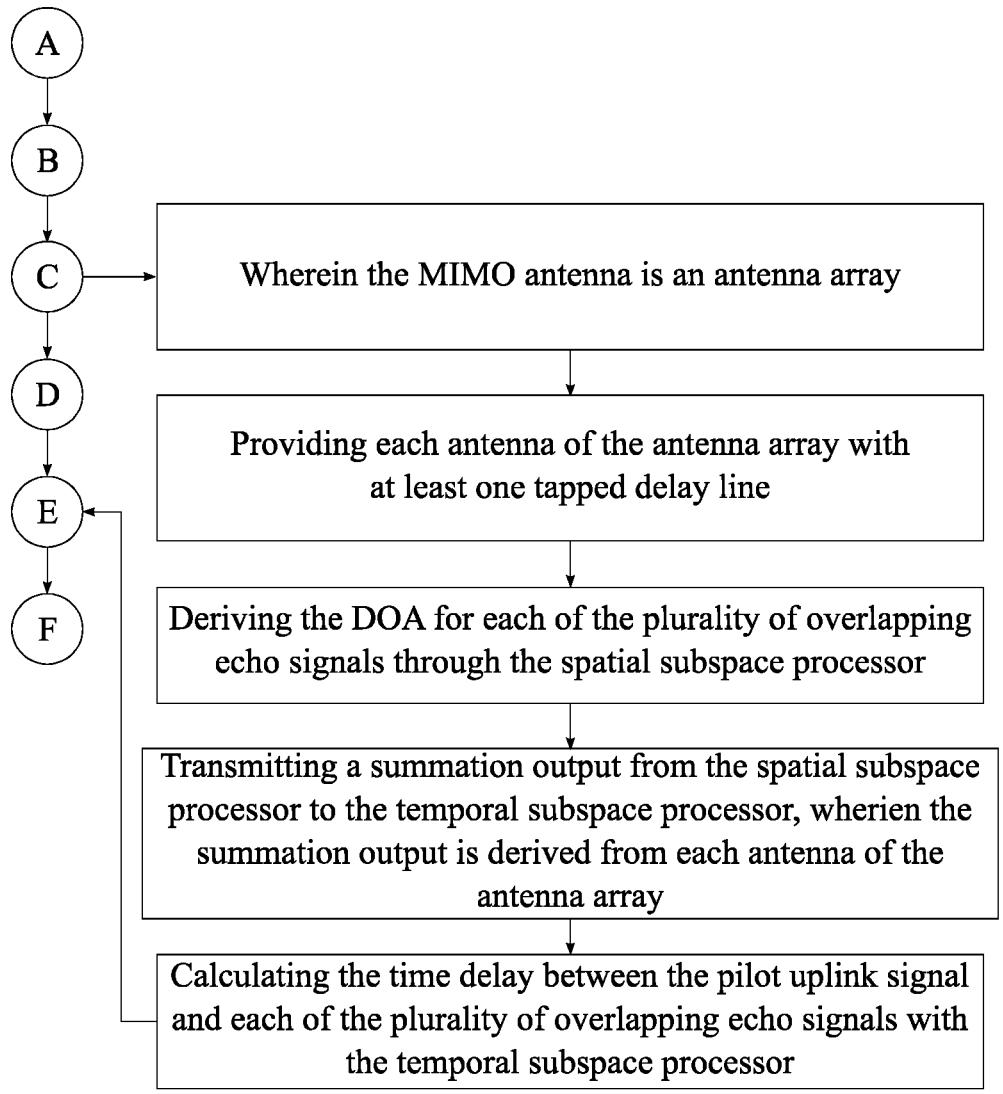
FIG. 19 is a flowchart illustrating the basic overall process of using at least one tapped delay line.
Figure 20:
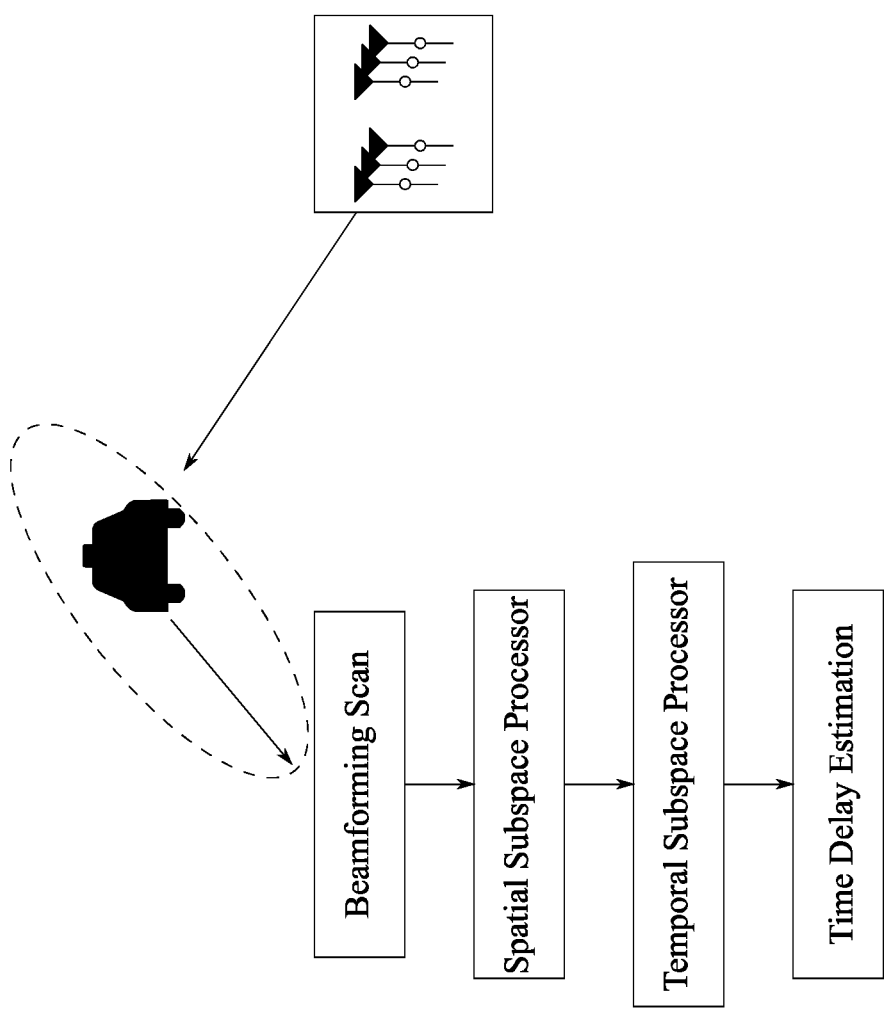
FIG. 20 is another illustration of the location approximation process.

To accommodate multiple angles, transmit omnidirectionally, and receive the plurality of overlapping echo signals from varying angles, the MIMO antenna is preferably an antenna array. Each antenna of the antenna array is provided with at least one tapped delay line that allows a signal to be delayed by several samples. When in use, the DOA for each of the plurality of overlapping echo signals is derived through the spatial subspace processor. Next, as shown in FIG. 18 and FIG. 19, a summation output from the spatial subspace processor is transmitted to the temporal subspace processor, wherein the summation output is derived by summing the outputs from each antenna of the antenna array. When the summation output is received at the temporal subspace processor, the time delay between the pilot uplink signal and each of the plurality of overlapping echo signals can be calculated.

The Rayleigh quotient can also be used in time delay calculations. When used, the Rayleigh quotient can be defined by the following equation.

$$J(x) = \frac{x^T R x}{x^T x}$$

Utilizing the Rayleigh quotient, the Rayleigh principle can be stated as:

$$\min_x J(x) = \frac{V_1^T R v_1}{V_1^T v_1} = \lambda_1$$

When calculating the time delay using the Rayleigh principle for observations $\{r(i), i=1, \ldots, n\}$, the Rayleigh quotient for the observations can be defined as:

$$\min_x J(x) \text{ subject to } x^T x = 1$$

$$x(k) = \alpha(k)[x(k-1) - P(k)\psi(k)e(k)]$$

$$P(k) = P(k-1) - \frac{P(k-1)\psi(k)\psi^T(k)P(k-1)}{1 + \psi^T P(k-1)\psi(k)}$$

$$\psi(k) = r(k) - x(k-1)e(k)$$

$$\alpha(k) = \frac{\|x(k-1)\|}{\|x(k)\|}$$

$$e(k) = \frac{x^T(k-1)r(k)}{\|x(k-1)\|}$$

To accommodate the time delay that is not constant due to the varying speeds of each of the plurality of targets, a forget factor of $\lambda$ is introduced, and the overall Rayleigh function would change to the following equation:

$$\hat{J}_g(x) = \frac{1}{n}\sum_{i=1}^{n} n\lambda^{n-i} J_i(x) = \frac{1}{n}\sum_{i=1}^{n} \lambda^{n-i} \frac{x^T r_i r_i^T x}{x^T x} = \alpha \frac{x^T \hat{R} x}{x^T x}$$

Thus, the recursive algorithm derived from the Rayleigh principle would change to the following equation:

$$P(k) = \frac{1}{\lambda}\left[\frac{P(k-1) - P(k-1)\psi(k)\psi^T(k)P(k-1)}{\lambda + \psi^T P(k-1)\psi(k)}\right]$$

After further calculations, the minimum eigenvector can be determined as follows:

$$x(k) = \alpha(k)[x(k-1) - P(k)\psi(k)e(k)]$$

$$\psi(k) = r(k) - x(k-1)e(k)$$

$$\alpha(k) = \frac{\|x(k-1)\|}{\|x(k)\|}$$

$$e(k) = \frac{X^T(k-1)r(k)}{\|x(k-1)\|}$$

-continued $$\Phi(\theta) = \frac{A*(\theta)A(\theta)}{\|A(\theta) + \vec{v}_i^-\|^{\wedge}2}$$

Figure 9:
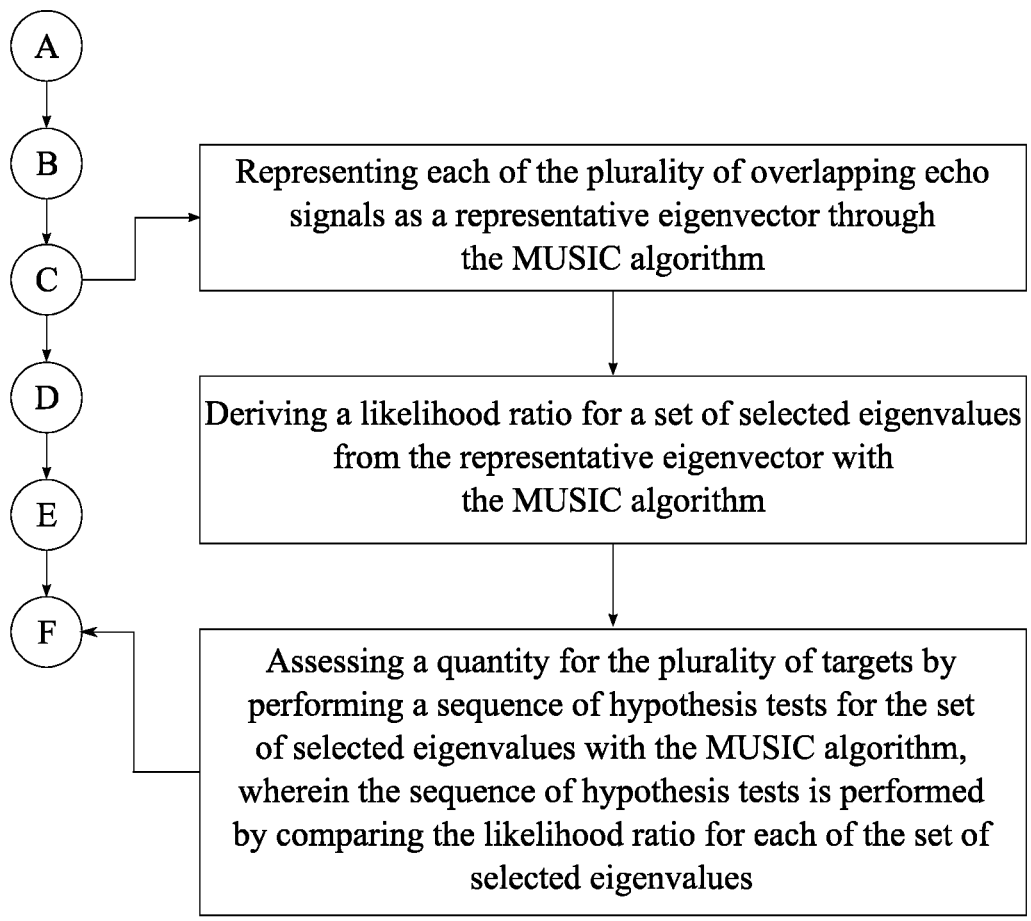
FIG. 9 is a flowchart illustrating the basic overall process of executing the MUSIC algorithm to assess a quantity for the plurality of targets through a sequence of hypothesis tests.

Similar to calculating the time delay and the DOA for the plurality of overlapping echo signals, the MUSIC algorithm can also be used to determine the number of targets that initiated the plurality of overlapping echo signals. As shown in FIG. 9, in order to do so, the present invention utilizes the MUSIC algorithm to derive a likelihood ratio for a set of selected eigenvalues from the representative eigenvector. Next, the quantity for the plurality of targets is assessed by performing a sequence of hypotheses tests on the set of selected eigenvalues selected from the representative eigenvector. To do so, the MUSIC algorithm compares a likelihood ratio for each of the set of selected eigenvalues. By doing so, a quantity of the plurality of targets is derived, wherein each of the quantity of the plurality of targets corresponds to a signal selected from the plurality of overlapping echo signals. The likelihood ratio used in the calculation can be represented as:

$$LR(p) = \left\{ \frac{[\prod_{1}^{p} \lambda_i]^{1/p}}{\left(\frac{1}{p}\right) \sum_{1}^{p} \lambda_i} \right\}^{\frac{pK}{2}}$$

Figure 10:
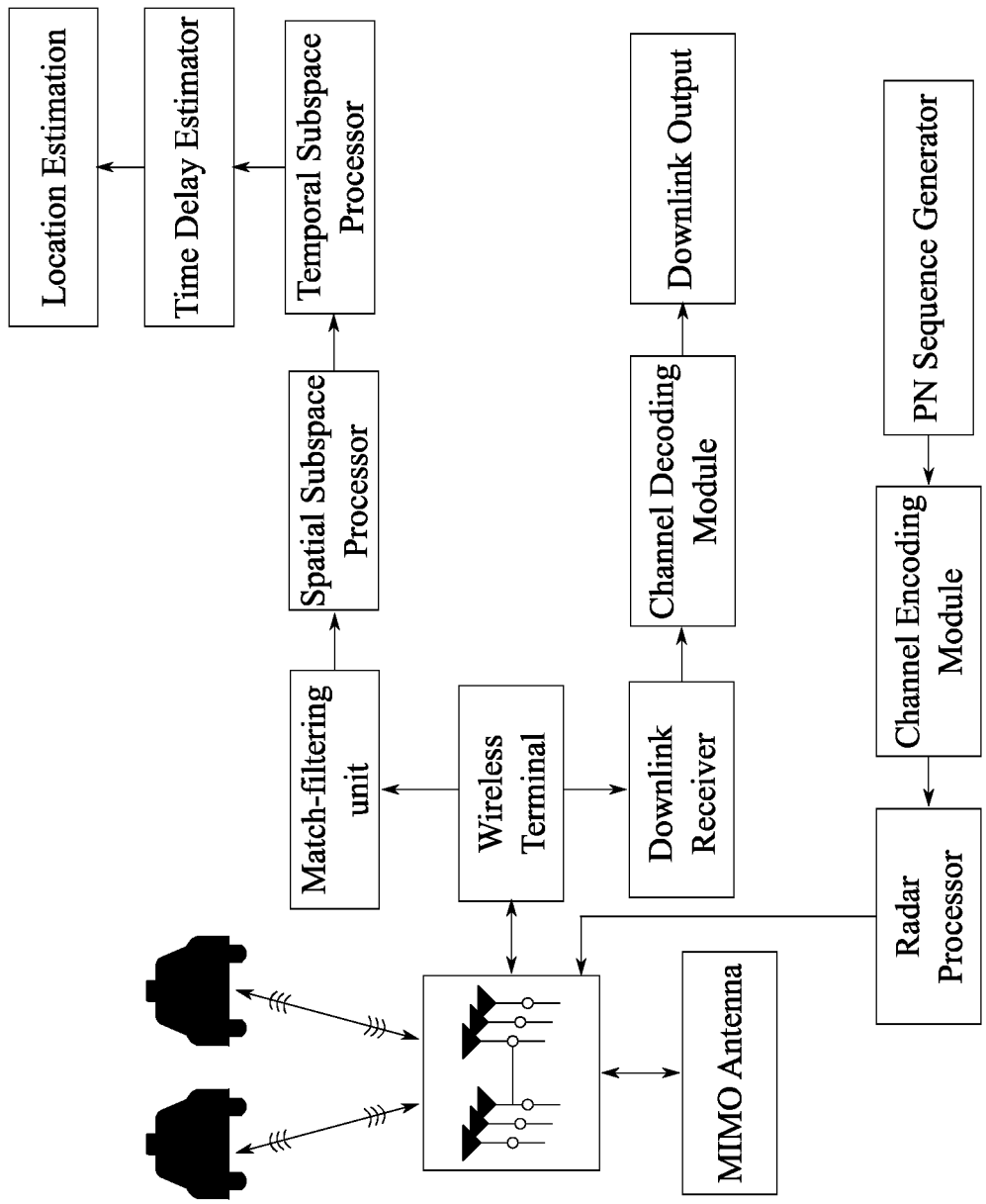
FIG. 10 is an illustration of the pilot uplink signal encoding module and received signal decoding process.
Figure 11:
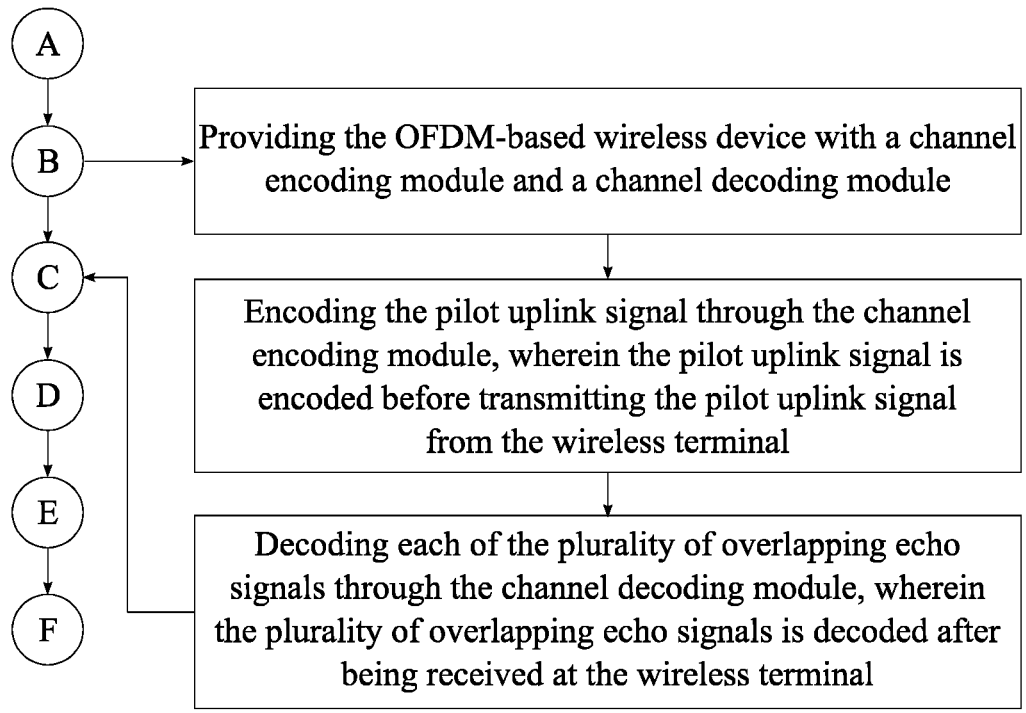
FIG. 11 is a flowchart illustrating the basic overall process of encoding the pilot uplink signal and decoding the plurality of overlapping echo signals.
Figure 12:
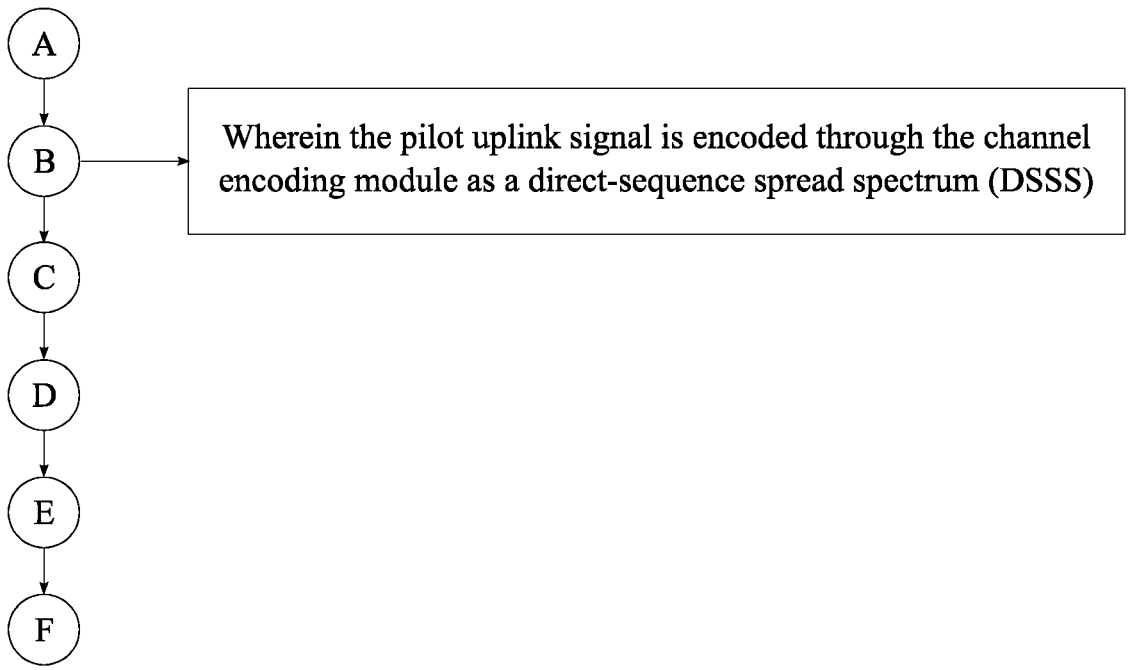
FIG. 12 is a flowchart illustrating the basic overall process of encoding the pilot uplink signal as a direct-sequence spread spectrum (DSSS).
Figure 13:
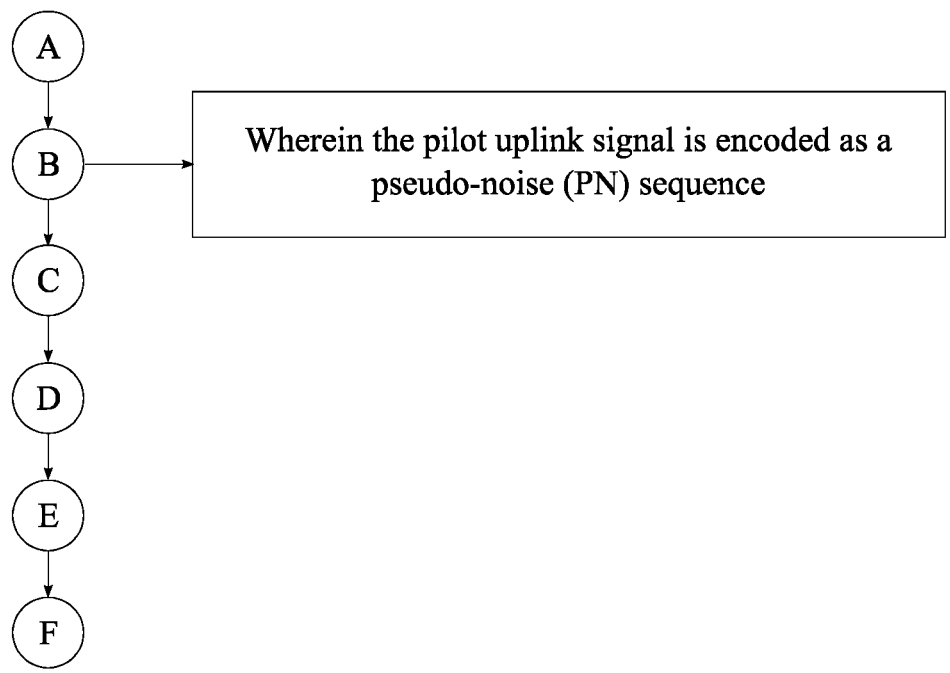
FIG. 13 is a flowchart illustrating the basic overall process of encoding the pilot uplink signal as a pseudo-noise (PN) sequence.

To increase the overall accuracy of the location approximation process, the present invention can utilize an encoding process and a decoding process. More specifically, the pilot uplink signal can be encoded initially, and the plurality of overlapping echo signals can be decoded when received. As seen in FIG. 10 and FIG. 11, the OFDM-based wireless device is provided with a channel encoding module and a channel decoding module. Thus, the pilot uplink signal can be encoded prior to being transmitted from the wireless terminal. The encoding process can vary in different embodiments of the present invention. As seen in FIG. 12, in one instance, the pilot uplink signal can be encoded as a direct-sequence spread spectrum (DSSS) so that the data of the pilot uplink signal is spread along a larger bandwidth. As seen in FIG. 13, in another instance, the pilot uplink signal can be encoded as a pseudo-noise (PN) sequence. When the pilot uplink signal that was encoded results in the plurality of overlapping echo signals, the channel decoding module decodes the plurality of overlapping echo signals received through the MIMO antenna at the wireless terminal. The decoding process ensures that the original data of the pilot uplink signal is restored from the plurality of overlapping echo signals.

Figure 14:
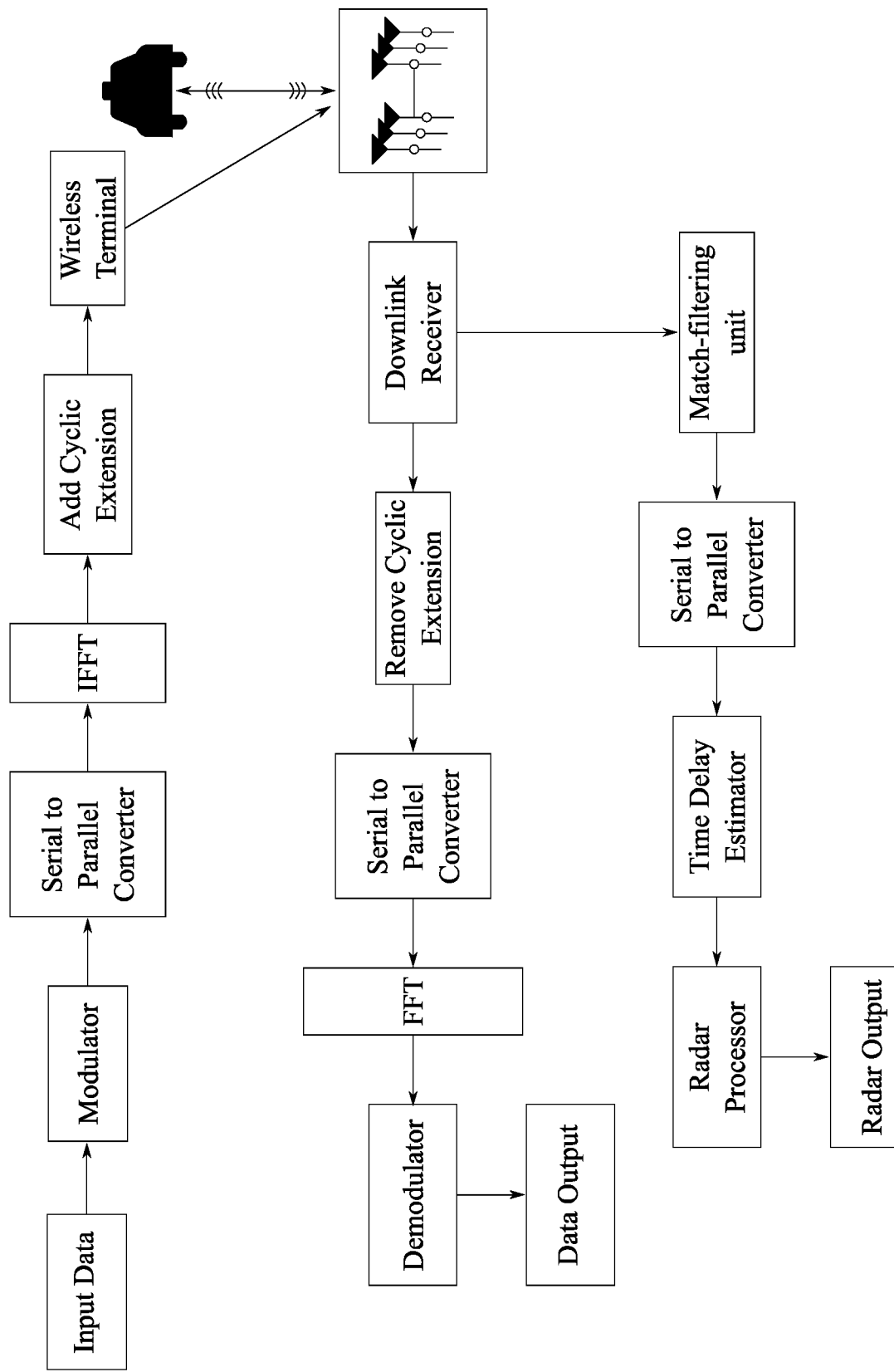
FIG. 14 is an illustration of using a match-filtering unit to filter out a downlink signal.
Figure 15:
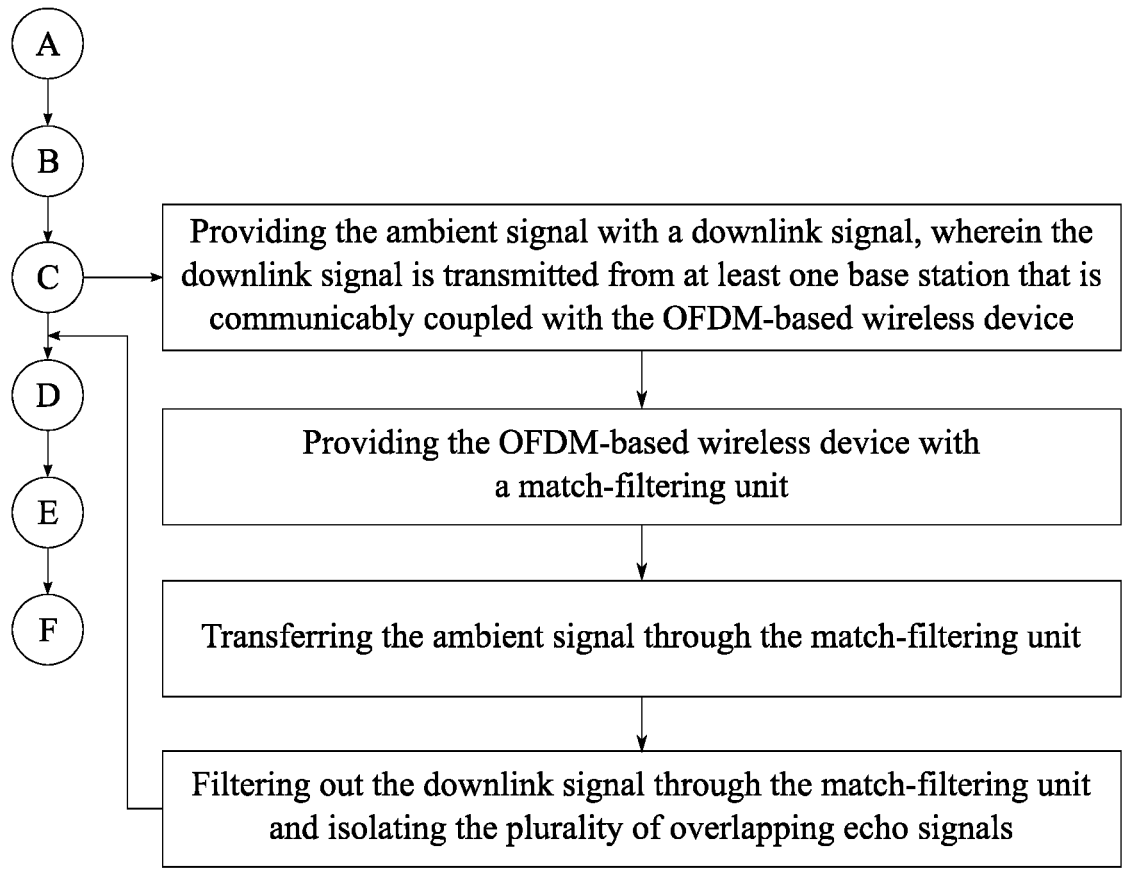
FIG. 15 is a flowchart illustrating the basic overall process of filtering out the downlink signal through a match-filtering unit.

In addition to the plurality of overlapping echo signals, the ambient signal further comprises a downlink signal that is transmitted from at least one base station that is communicably coupled with the OFDM-based wireless device. Thus, as shown in FIG. 14 and FIG. 15, to filter out the downlink signal and isolate the plurality of overlapping echo signals, the OFDM-based wireless device is provided with a match-filtering unit. Therefore, by transmitting the ambient signal through the match-filtering unit, the ambient signal can be filtered out and the plurality of overlapping echo signals can be isolated for time delay calculations and determining the DOA.

Figure 16:
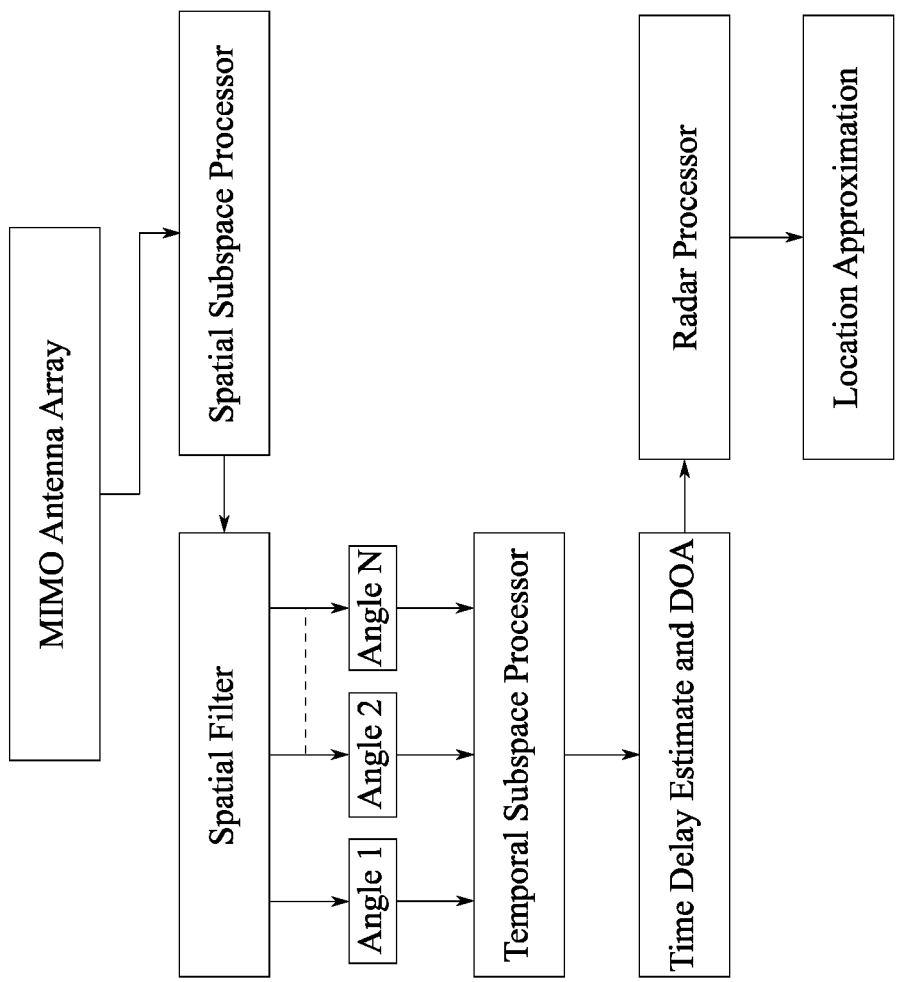
FIG. 16 is an illustration of using a radar processor in the location approximation process.
Figure 17:
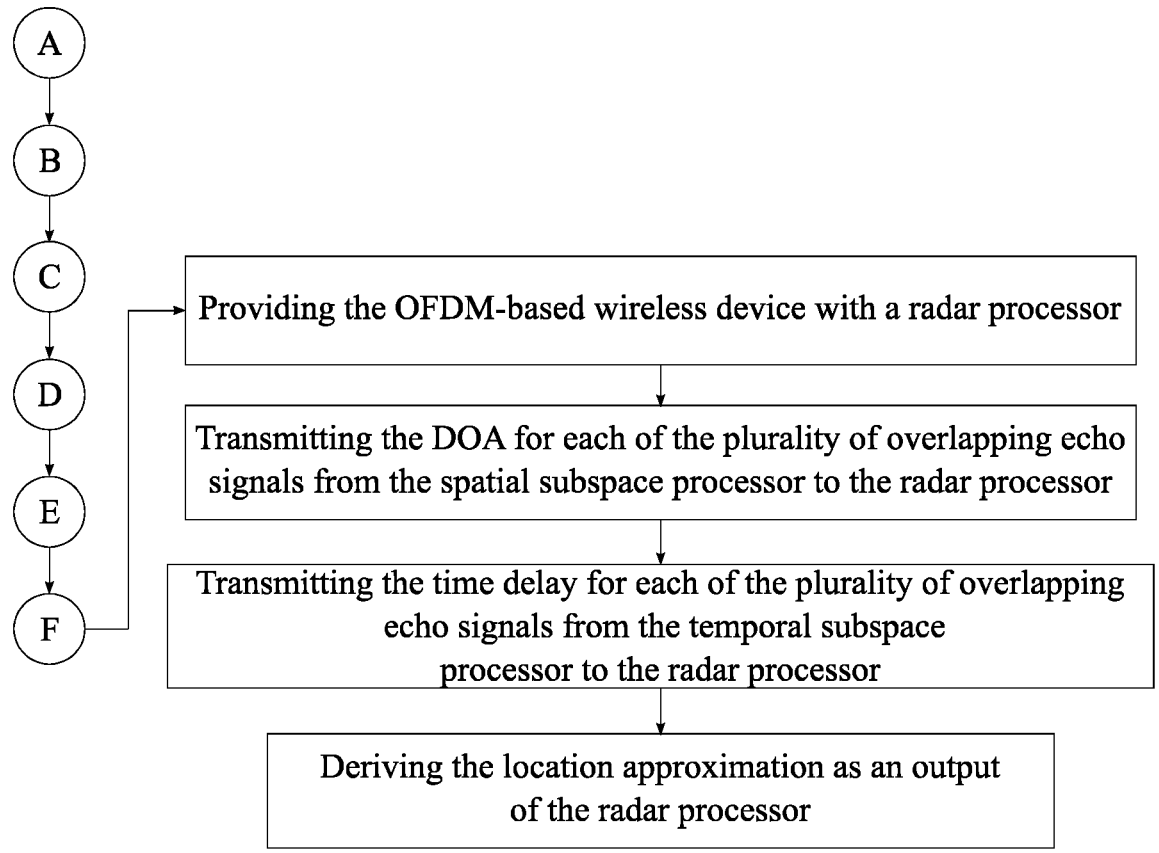
FIG. 17 is a flowchart illustrating the basic overall process of using the radar process in the location approximation process.

As shown in FIG. 16 and FIG. 17, to aid with the process of location approximation, the OFDM-based wireless device is provided with a radar processor. More specifically, the radar processor is used to receive the time delay information and the DOA information to accurately derive the location approximation for the plurality of targets. To do so, the time delay for each of the plurality of overlapping echo signals determined through the temporal subspace processor, and the DOA for each of the plurality of overlapping echo signals determined through the spatial subspace processor is transmitted to the radar processor. Thus, the radar processor proceeds to derive the location approximation for the plurality of targets as an output. In addition to the location information, a corresponding speed can also be derived from the location approximation.

Although the invention has been explained in relation to its preferred embodiment, it is to be understood that many other possible modifications and variations can be made without departing from the spirit and scope of the invention as hereinafter claimed.

What is claimed is:

1. A method of using time domain subspace signals and spatial domain subspace signals for location approximation through an orthogonal frequency-division multiplexing (OFDM)-based wireless device comprises the steps of:
   (A) providing an orthogonal frequency-division multiplexing (OFDM)-based wireless device, wherein the OFDM-based wireless device comprises a wireless terminal, a multiple-input and multiple-output (MIMO) antenna, a spatial subspace processor, and a temporal subspace processor;
   (B) transmitting a pilot uplink signal through the wireless terminal to a plurality of targets, wherein the plurality of targets is positioned within an operational range of the MIMO antenna;
   (C) receiving an ambient signal through the MIMO antenna, wherein the ambient signal comprises a plurality of overlapping echo signals, wherein the plurality of overlapping echo signals is generated from each of the plurality of targets;
   (D) deriving a direction of arrival (DOA) for each of the plurality of overlapping signals with the OFDM-based wireless device by processing the plurality of overlapping echo signals through the spatial subspace processor;
   (E) calculating a time delay between the pilot uplink signal and each of the plurality of overlapping echo signals with the OFDM-based wireless device by processing the plurality of overlapping echo signals through the temporal subspace processor; and
   (F) deriving a location approximation for the plurality of targets with the OFDM-based wireless device from the time delay for each of the plurality of overlapping echo signals and the DOA for each of the plurality of overlapping echo signals.

2. The method of using time domain subspace signals and spatial domain subspace signals for location approximation through OFDM-based wireless device as claimed in claim 1 further comprises the steps of:
   providing the spatial subspace processor with a multiple signal classification (MUSIC) algorithm; and
   deriving the DOA for each of the plurality of overlapping echo signals by executing the MUSIC algorithm with the spatial subspace processor.

3. The method of using time domain subspace signals and spatial domain subspace signals for location approximation through OFDM-based wireless device as claimed in claim 2 further comprises the steps of:

representing the plurality of overlapping echo signals as a representative eigenvector through the MUSIC algorithm;

estimating a maximum eigenvector through the MUSIC algorithm, wherein the maximum eigenvector is estimated from the representative algorithm; and deriving the DOA for each of the plurality of overlapping echo signals by searching a corresponding subspace spanned by the maximum eigenvector.

4. The method of using time domain subspace signals and spatial domain subspace signals for location approximation through OFDM-based wireless device as claimed in claim 1 further comprises the steps of:

providing the temporal subspace processor with a MUSIC algorithm; and in step (E), calculating the time delay between the pilot uplink signal and each of the plurality of overlapping echo signals with the OFDM-based wireless device further by executing the MUSIC algorithm through the temporal subspace processor.

5. The method of using time domain subspace signals and spatial domain subspace signals for location approximation through OFDM-based wireless device as claimed in claim 4 further comprises the steps of:

representing the plurality of overlapping echo signals as a representative eigenvector through the MUSIC algorithm;

estimating a minimum eigenvector through the MUSIC algorithm, wherein the minimum eigenvector is estimated from the representative eigenvector; and calculating the time delay between the pilot uplink signal and each of the plurality of echo signals by searching a corresponding subspace derived from the minimum eigenvector.

6. The method of using time domain subspace signals and spatial domain subspace signals for location approximation through OFDM-based wireless device as claimed in claim 5, wherein the minimum eigenvector is orthogonal to a signature vector of each of the plurality of overlapping echo signals.

7. The method of using time domain subspace signals and spatial domain subspace signals for location approximation through OFDM-based wireless device as claimed in claim 4 further comprises the steps of:

representing each of the plurality of overlapping echo signals as a representative eigenvector through the MUSIC algorithm;

deriving a likelihood ratio for a set of selected eigenvalues from the representative eigenvector with the MUSIC algorithm; and assessing a quantity for the plurality of targets by performing a sequence of hypothesis tests for the set of selected eigenvalues with the MUSIC algorithm, wherein the sequence of hypothesis tests is performed by comparing the likelihood ratio for each of the set of selected eigenvalues.

8. The method of using time domain subspace signals and spatial domain subspace signals for location approximation through OFDM-based wireless device as claimed in claim 1 further comprises the steps of:

providing the OFDM-based wireless device with a channel encoding module and a channel decoding module;

encoding the pilot uplink signal through the channel encoding module, wherein the pilot uplink signal is encoded before transmitting the pilot uplink signal from the wireless terminal; and decoding each of the plurality of overlapping echo signals through the channel decoding module, wherein the plurality of overlapping echo signals is decoded after being received at the wireless terminal.

9. The method of using time domain subspace signals and spatial domain subspace signals for location approximation through OFDM-based wireless device as claimed in claim 8, wherein the pilot uplink signal is encoded through the channel encoding module as a direct-sequence spread spectrum (DSSS).

10. The method of using time domain subspace signals and spatial domain subspace signals for location approximation through OFDM-based wireless device as claimed in claim 8, wherein the pilot uplink signal is encoded as a pseudo-noise (PN) sequence.

11. The method of using time domain subspace signals and spatial domain subspace signals for location approximation through OFDM-based wireless device as claimed in claim 1 further comprises the steps of:

providing the ambient signal with a downlink signal, wherein the downlink signal is transmitted from at least one base station that is communicably coupled with the OFDM-based wireless device;

providing the OFDM-based wireless device with a match-filtering unit;

transferring the ambient signal through the match-filtering unit; and filtering out the downlink signal through the match-filtering unit and isolating the plurality of overlapping echo signals.

12. The method of using time domain subspace signals and spatial domain subspace signals for location approximation through OFDM-based wireless device as claimed in claim 1 further comprises the steps of:

providing the OFDM-based wireless device with a radar processor;

transmitting the DOA for each of the plurality of overlapping echo signals from the spatial subspace processor to the radar processor;

transmitting the time delay for each of the plurality of overlapping echo signals from the temporal subspace processor to the radar processor; and deriving the location approximation as an output of the radar processor.

13. The method of using time domain subspace signals and spatial domain subspace signals for location approximation through OFDM-based wireless device as claimed in claim 1 further comprises the steps of:

wherein the MIMO antenna is an antenna array;

providing each antenna of the antenna array with at least one tapped delay line;

deriving the DOA for each of the plurality of overlapping echo signals by transmitting the plurality of overlapping echo signals through the spatial subspace processor;

transmitting a summation output from the spatial subspace processor to the temporal subspace processor, wherein the summation output is derived from each antenna of the antenna array; and calculating the time delay between the pilot uplink signal and each of the plurality of overlapping echo signals with the temporal subspace processor.

14. The method of using time domain subspace signals and spatial domain subspace signals for location approximation through OFDM-based wireless device as claimed in claim 1, wherein a corresponding speed for each of the plurality of targets is derived from the location approximation.

15. The method of using time domain subspace signals and spatial domain subspace signals for location approximation through OFDM-based wireless device as claimed in claim 1, wherein the pilot uplink signal comprises a plurality of subcarriers.

* * * * *